United States Patent
Collins et al.

(10) Patent No.: US 6,912,465 B2
(45) Date of Patent: Jun. 28, 2005

(54) SYSTEM AND METHOD FOR DETERMINING DOWNHOLE CLOCK DRIFT

(75) Inventors: Anthony L. Collins, Houston, TX (US); Andrew Hawthorn, Stafford, TX (US); Cengiz Esmersoy, Sugar Land, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 4 days.

(21) Appl. No.: 10/248,034

(22) Filed: Dec. 12, 2002

(65) Prior Publication Data

US 2004/0117118 A1 Jun. 17, 2004

(51) Int. Cl.[7] ................................................ G01V 1/40
(52) U.S. Cl. ............................. 702/6; 702/11; 702/18
(58) Field of Search ................................. 702/6, 11, 18

(56) References Cited

U.S. PATENT DOCUMENTS

| | | | |
|---|---|---|---|
| 4,281,403 A | 7/1981 | Siems et al. | 367/76 |
| 4,363,112 A | 12/1982 | Widrow | |
| 5,130,949 A | 7/1992 | Kan et al. | |
| 5,343,152 A * | 8/1994 | Kuckes | 324/346 |
| 5,555,220 A | 9/1996 | Minto | 367/86 |
| 6,002,640 A * | 12/1999 | Harmon | 367/38 |
| 6,023,444 A | 2/2000 | Naville et al. | |
| 6,078,868 A | 6/2000 | Dubinsky | |
| 6,131,694 A | 10/2000 | Robbins et al. | |
| 6,308,137 B1 | 10/2001 | Underhill et al. | |
| 6,400,646 B1 | 6/2002 | Shah et al. | |
| 6,424,595 B1 * | 7/2002 | Chenin | 367/82 |
| 6,430,508 B1 | 8/2002 | Sudhakar et al. | |
| 6,584,406 B1 * | 6/2003 | Harmon et al. | 702/6 |
| 2002/0060952 A1 | 5/2002 | Cecconi et al. | |

FOREIGN PATENT DOCUMENTS

WO    WO 97/14869    4/1997

* cited by examiner

Primary Examiner—Marc S. Hoff
Assistant Examiner—Anthony Gutierrez
(74) Attorney, Agent, or Firm—Victor H. Segura; Brigitte L. Echols

(57) ABSTRACT

Techniques are presented for determining the drift of a clock adapted for subsurface disposal. Seismic signals are transmitted through the subsurface medium from an uphole location at selected times, acoustic signals associated with the transmitted seismic signals are received with acoustic sensors at identified downhole locations. First and second transit times for acoustic signals received at an identified downhole reference location are determined using the clock. A time difference between the first and second signal transit times at the reference point is calculated to determine the clock drift.

28 Claims, 3 Drawing Sheets

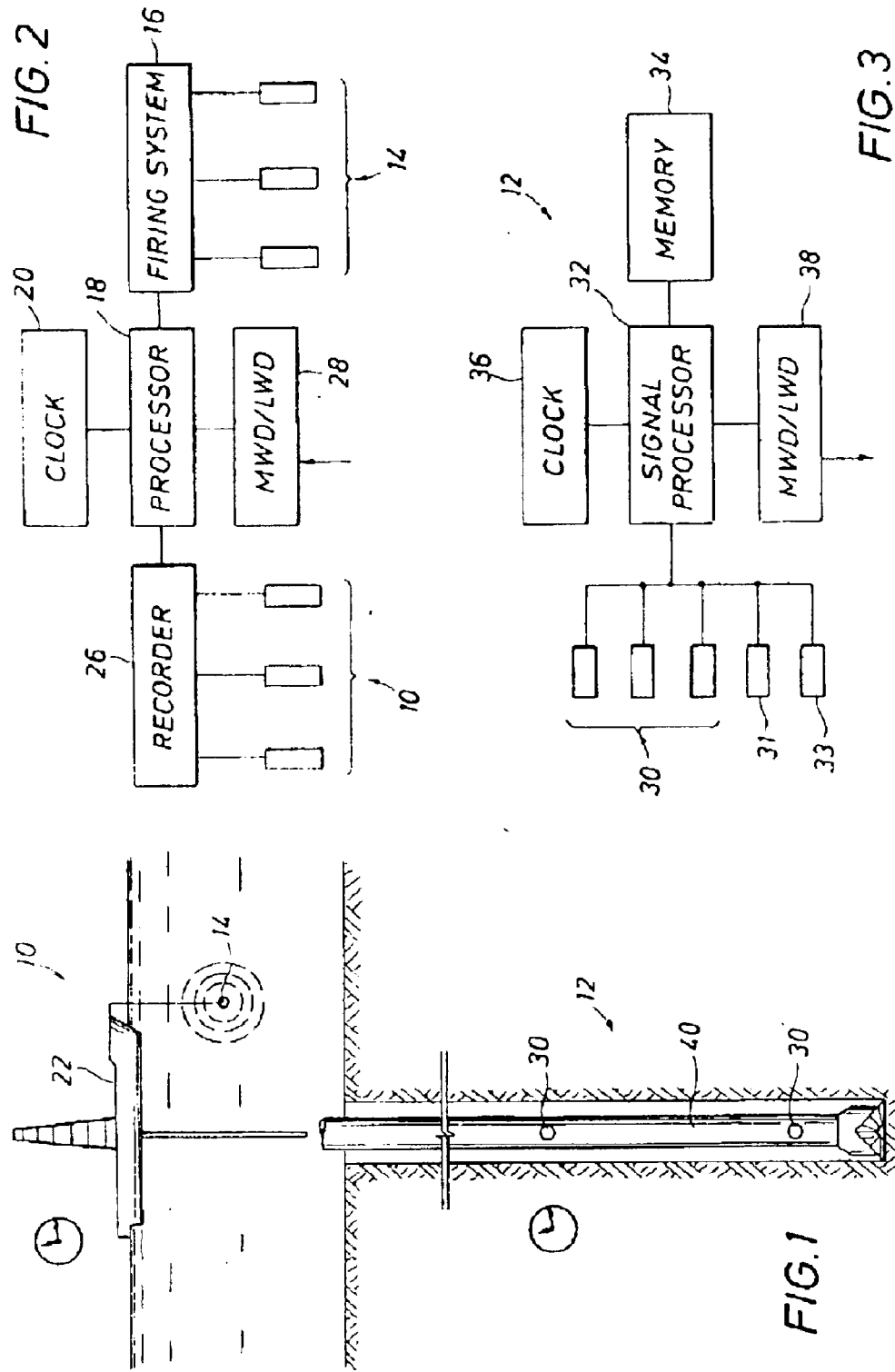

SYSTEM AND METHOD FOR DETERMINING DOWNHOLE CLOCK DRIFT

BACKGROUND OF INVENTION

1. Field of the Invention

The invention relates to clock calibration techniques. More particularly, the invention relates to a process for determining clock drift in oilfield operations.

2. Background Art

In the oil-drilling and exploration industry, many types of sensors are used to measure phenomena related to subsurface physical properties (e.g. density, conductivity, or porosity) to evaluate subsurface conditions, commonly referred to as well logging. Most of these measurements can be performed either after a borehole has been drilled, using a wireline tool, or simultaneously with the drilling of the borehole, i.e., logging-while-drilling (LWD) or measurement-while-drilling (MWD). LWD/MWD measurements are generally taken with tools mounted within drill collars forming part of a drill string.

One type of LWD/MWD technique uses sound waves, also referred to as seismic or acoustic waves to measure subsurface properties. These seismic systems generally entail a seismic source, sensors, and a memory and calculating device for storing and processing the received seismic signals. Conventional seismic sources generate a physical disturbance that produces acoustic or seismic signals that propagate through the subsurface medium (formation or water) and are detected by a remote acoustic sensor. The acoustic sensors (hydrophones or geophones) may be located in a drill string for LWD/MWD measurements, or in a casing segment for monitoring operations, and typically in the vicinity of the source. The geophones or hydrophones in the drill string transmit the detected signals to a memory and calculation unit that processes the signals. U.S. Pat. Nos. 6,308,137, 5,585,556, 5,130,949, 5,144,589, 6,430,508, and 4,363,112 generally describe oilfield seismic measurement techniques.

The acoustic signals or waves produced by the seismic source are periodic vibrational disturbances resulting from the acoustic energy propagating through the medium. These signals are detected by the hydrophones or geophones and typically characterized in terms of their frequency, amplitude, and speed of propagation. The transit or arrival times of the acoustic signals through the subsurface medium provide useful information of the subsurface properties. Clocks or chronometers are used to determine the elapsed time between the initial source firing and the receipt of the signals detected at the sensor. Application of standard physics principles using signal speed, elapsed time, and distance, allows one to determine the subsurface parameters in the seismic measurement. As known in the art, the propagation speed of an acoustic signal is influenced by the medium and must be taken into account in seismic measurements.

One way of accounting for the influence of the medium on seismic measurements is known as a "checkshot" measurement. A checkshot or test signal is transmitted a known distance through the medium and the signal travel time is used to determine the signal speed. The elapsed travel time of the acoustic signal is typically determined using a clock coupled to the source and synchronized with a clock coupled to the remote sensor. In this manner, the two clocks, along with a processing device, make possible a precise calculation of the transit or arrival time of the seismic signal between the source and the remote sensor.

The use of independent clocks to determine the elapsed signal travel time has its drawbacks. In conventional drilling and monitoring operations, the measurement apparatus are typically disposed in subsurface mediums for extended periods of time. The longer the period of sustained subsurface measurements, the greater the influence of the natural drift between the source clock and the sensor clock becomes on the seismic measurements unless the clocks are calibrated back into synchronization. The degree of drift between the clocks is affected by factors including calibration errors, clock accuracy, and the clock housing (temperature control, shock resistance, etc.). Various approaches have been developed to address clock drift. U.S. Pat. Nos. 6,078,868, 6,400,646, 6,131,694, 4,281,403 and U.S. Published Pat. App. Ser. No. 2002/0,060,952A1 describe various approaches to compensate for clock drift.

There remains a need for improved techniques to determine clock drift and to compensate for such drift or calibrate the clocks.

SUMMARY OF INVENTION

The invention provides a method for determining the drift of a clock adapted for subsurface disposal. The method includes transmitting a seismic signal through a subsurface medium from an uphole location at a selected time; receiving an acoustic signal associated with the transmitted seismic signal using an acoustic sensor at an identified downhole location; determining a first transit time for the acoustic signal received at the downhole location using the clock; transmitting a second seismic signal through the subsurface medium from the uphole location at another selected time; receiving an acoustic signal associated with the second transmitted seismic signal with the acoustic sensor again situated at the identified downhole location; determining a second transit time for the received signal associated with the second transmitted seismic signal using the clock; and calculating a difference between the first and second transit times of the signals.

The invention provides a method for determining the drift of a clock disposed on a tool adapted for subsurface disposal. The method includes tracking the location of the tool while in subsurface transit; transmitting a signal through the subsurface medium from a surface seismic source at a selected time; receiving an acoustic signal associated with the transmitted signal at an acoustic sensor disposed on the tool when the tool is at an identified subsurface location; determining a first transit time for the received acoustic signal using the clock; subsequently returning the tool to the identified subsurface location; transmitting a second signal through the subsurface medium from the surface seismic source at another selected time; receiving an acoustic signal associated with the second transmitted signal at the acoustic sensor with the tool situated at the identified subsurface location; determining a second transit time for the received acoustic signal associated with the second transmitted signal using the clock; and calculating a difference between the first and second transit times of the signals.

The invention provides a system for determining the drift of a clock disposed on a tool adapted for subsurface disposal. The system includes an acoustic sensor disposed on the tool and adapted to receive acoustic signals according to a schedule; processing means coupled to the acoustic sensor for processing the received acoustic signals; the processing means coupled to the clock and including means to determine arrival times for the acoustic signals received at identified subsurface locations; the processing means including means to calculate a difference between the determined arrival times corresponding to the acoustic signals received at the identified subsurface locations; and the processing means including means to adjust the clock or the arrival time determinations based on the calculated time difference.

BRIEF DESCRIPTION OF DRAWINGS

FIG. 1 is a schematic illustration of an exemplary seismic measurement system of the invention.

FIG. 2 is a simplified block diagram of the surface equipment of a system of the invention.

FIG. 3 is a simplified block diagram of the downhole equipment of a system of the invention.

DETAILED DESCRIPTION

Figure 4:
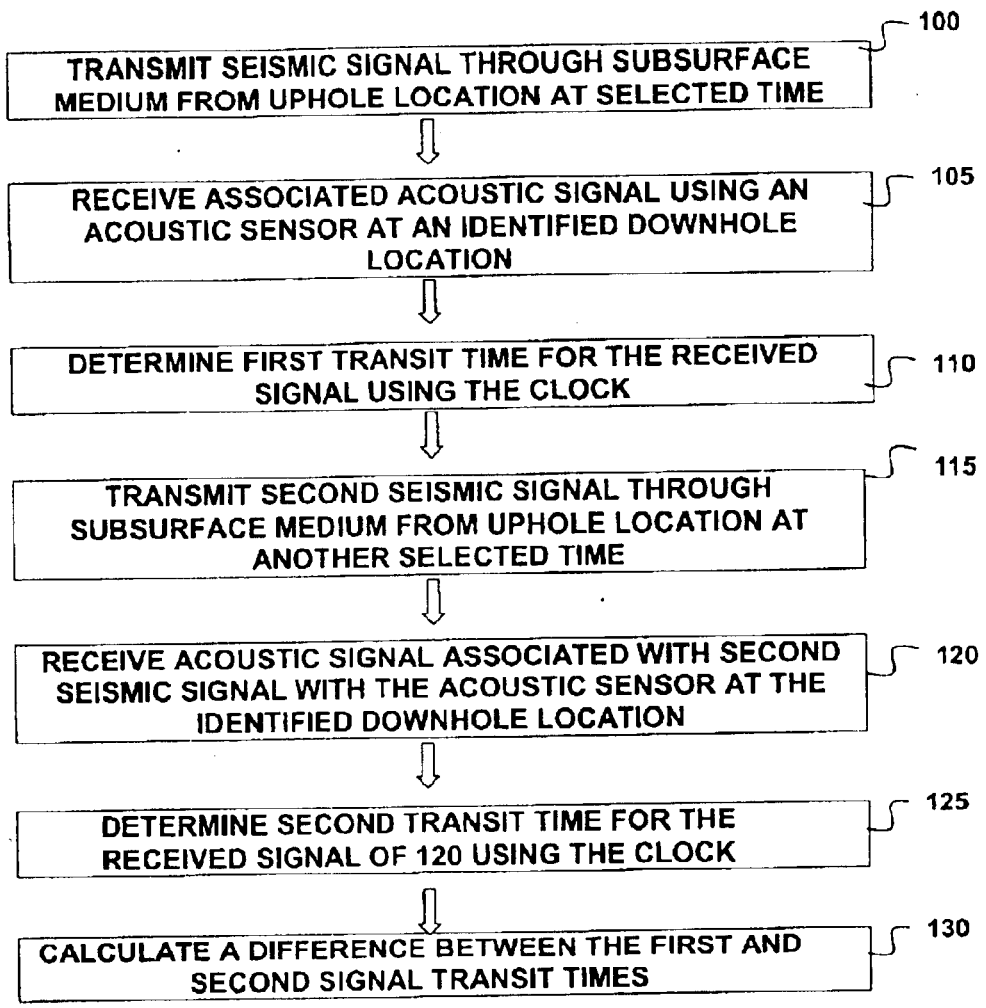
FIG. 4 is a flow chart of a process according to the invention.

FIGS. 1–3 show a conventional system for obtaining seismic measurements in oilfield operations. The system includes surface or uphole equipment 10 and subsurface or downhole equipment 12, which includes an LWD/MWD tool. The uphole equipment includes a seismic source 14 (in this case an array) coupled to a firing system 16, a programmable processor 18, and a clock 20 coupled to the processor. In the illustration of FIG. 1, the firing system, processor, and clock are located on an off shore rig 22 and the seismic source 14 is deployed near the rig, close to the surface of the water. Preferably, the uphole equipment 10 also includes acoustic sensors 24 and a recorder 26 for capturing reference signals near the source. The uphole equipment 10 further preferably includes telemetry equipment 28 for receiving LWD/MWD signals from the downhole equipment via telemetry means known in the art. The telemetry equipment 28 and the recorder 26 are preferably coupled to the processor 18 so that recordings may be synchronized using the clock 20.

The downhole equipment 12 includes one or more acoustic sensors 30 disposed on the tool, signal processing equipment 32, memory 34, and a clock 36. The sensor (s) 30, clock 36 and memory 34 are coupled to the signal processor 32 so that recordings may be made of signals detected by the sensors in synchronization with the firing of the seismic source 14. Preferably, the downhole equipment 12 also includes a motion sensor 31, a mudflow sensor 33, and LWD/MWD telemetry equipment 38 for transmitting data to the uphole equipment 10. As illustrated in FIG. 1, the downhole equipment 12 forms part of a drill string 40 that is disposed in a borehole beneath the ocean bed. The clocks 20 and 36 are preferably accurate enough so that they remain within a few milliseconds of each other while in operation.

The present invention entails a calculation of the clock 36 drift. According to an embodiment of the invention, at some depth, and at a predetermined time window or schedule, the source 14 is fired. The sensor(s) 30 receives the signal and the clock 36 and signal processor 32 time it and record it with respect to the time window. Each recording is a time interval, e.g. three seconds, which is synchronized to the schedule of the uphole firing system so that if a signal is being generated, it will be captured in a recording. The detected signals contain both transmitted and reflected waveforms.

The content of the memory 34 is processed by the processor 32 to determine the number of shots, the mean arrival or transit time, and the mean amplitude of the detected signals. This data may be sent to the surface or another remote location using the drilling fluid, electromagnetic telemetry means, or via any other conventional telemetry techniques. Alternatively, the information may be stored in the memory 34 and retrieved when the tool is tripped out of the borehole. In one embodiment, the detected signal waveforms are encoded by the processor and recorded for surface interpretation. As known in the art, circulation of the drilling fluid is preferably interrupted as the sensor 30 in the tool is activated for the registration of acoustic signals discharged from the seismic source 14.

According to the invention, as the tool travels through the subsurface medium, signal transit or arrival times are acquired at greater depths. Each acquired signal is correlated to an identifiable subsurface location using any of the well-known techniques to track the location or depth of the tool. Any one of the identifiable measurement points is then selected as a reference point and at a later time in the drilling or measurement operation, the tool is tripped back to the selected reference point and a new waveform is acquired. A calculation of the difference in apparent arrival times establishes the clock drift. Since the subsurface medium has not changed, the time difference is due to drift of the clock.

Once the clock drift is determined, it can be used to correct all the subsequent measurements. In one embodiment, the reference times are adjusted forward or back by the measured drift. Another embodiment entails adjusting the acquired data based on an assumption of linear drift with time. As the seismic measurement operation continues, the tool may be tripped back at specific time or depth intervals and drift calculations can be made using any desired reference point. In one embodiment, the tool is tripped always tripped back to an initial drift checkpoint to minimize error accumulation. In yet another embodiment, multiple points on the detected signal waveform are compared rather than just the first arrival/deflection point. In this manner, a more robust measurement is obtained and a statistical analysis may be performed on the multiple points to determine the clock drift. Further signal analysis may be performed on the detected waveforms to increase the accuracy of the calibration. U.S. Pat. No. 6,308,137 (incorporated herein by reference), for example, describes a technique that may be implemented with the present invention to determine a true source signal and eliminate useless data.

FIG. 4 illustrates an embodiment of the invention in flow chart form. The process begins at 100 with the transmission of a seismic signal through the subsurface medium from an uphole location at a selected time. At 105, an acoustic signal associated with the transmitted seismic signal is received using an acoustic sensor at an identified downhole location. At 110, a first transit time is determined for the acoustic signal received at the downhole location using the downhole clock. At 115, a second seismic signal is transmitted through the subsurface medium from the uphole location at another selected time. An acoustic signal associated with the second transmitted seismic signal is received with the acoustic sensor again situated at the identified downhole location at 120. At 125, a second transit time is determined for the received signal of step 120 using the clock. Then at 130, a difference between the first and second transit times of the signals is calculated.

Figure 5:
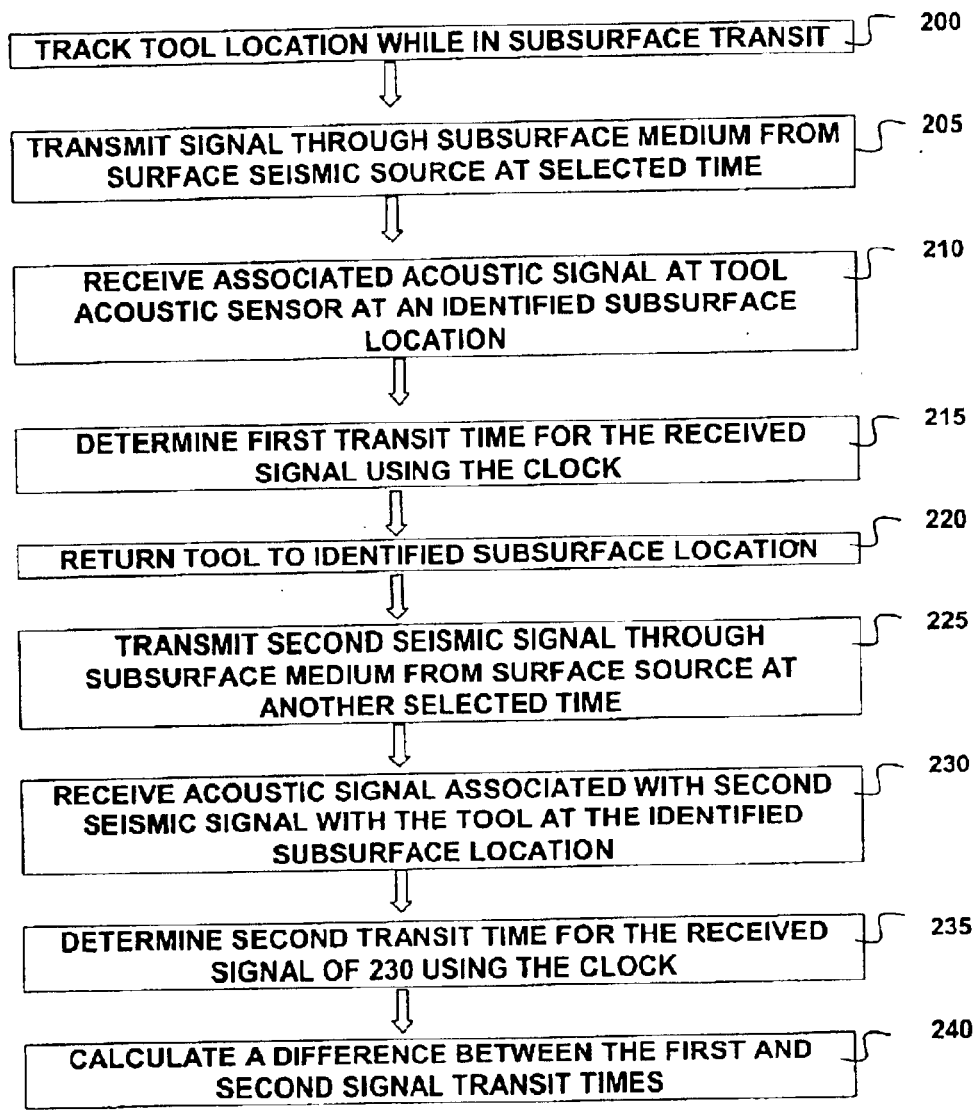
FIG. 5 is a flow chart of a process according to the invention.

FIG. 5 illustrates an embodiment of the invention in flow chart form. The process begins at 200 with tracking the location of the tool while in subsurface transit. At 205, a signal is transmitted through the subsurface medium from a surface seismic source at a selected time. At 210, an acoustic signal associated with the transmitted signal is received at an acoustic sensor disposed on the tool when the tool is at an identified subsurface location. The at step 215, a first transit time is determined for the received acoustic signal using the clock. At 220, the tool is subsequently returned to the identified subsurface location. At 225, a second signal is transmitted through the subsurface medium from the surface seismic source at another selected time. At 230, an acoustic signal associated with the second transmitted signal is received at the acoustic sensor with the tool situated at the identified subsurface location. A second transit time for the received acoustic signal of step 230 is determining using the clock at step 235. Then at 240, a difference between the first and second transit times of the signals is calculated.

It will be apparent to those skilled in the art that this invention may be implemented by programming one or more suitable general-purpose computers having appropriate hardware. The programming may be accomplished through the use of one or more program storage devices readable by the computer processor and encoding one or more programs of instructions executable by the computer for performing the operations described above. The program storage device may take the form of, e.g., one or more floppy disks; a CD ROM or other optical disk; a magnetic tape; a read-only memory chip (ROM); and other forms of the kind well known in the art or subsequently developed. The program of instructions may be "object code," i.e., in binary form that is executable more-or-less directly by the computer; in "source code" that requires compilation or interpretation before execution; or in some intermediate form such as partially compiled code. The precise forms of the program storage device and of the encoding of instructions are immaterial here. Thus these processing means may be implemented in the uphole equipment 10, in the downhole equipment 12, or shared by the two as known in the art.

For the purposes of this specification it will be clearly understood that the word "comprising" means "including but not limited to", and that the word "comprises" has a corresponding meaning.

What is claimed is:

1. A method for determining the drift of a clock adapted for subsurface disposal, comprising:
   (a) transmitting a seismic signal through a subsurface medium from an uphole location at a selected time;
   (b) receiving an acoustic signal associated with the transmitted seismic signal using an acoustic sensor at an identified downhole location;
   (c) determining a first transit time for the acoustic signal received at said downhole location using said clock;
   (d) transmitting a second seismic signal through the subsurface medium from the uphole location at another selected time;
   (e) receiving an acoustic signal associated with the second transmitted seismic signal with the acoustic sensor again situated at said identified downhole location;
   (f) determining a second transit time for the received signal of step (e) using said clock; and
   (g) calculating a difference between the first and second transit times of said signals.

2. The method of claim 1, wherein step (g) includes recording the calculated time difference.

3. The method of claim 1, further comprising adjusting the clock or the transit time determinations based on the calculated time difference.

4. The method of claim 1, wherein steps (c) or (f) include communicating the determined transit time to a remote location.

5. The method of claim 1, wherein step (d) includes transmitting said second seismic signal according to a schedule.

6. The method of claim 5, further comprising determining a clock drift rate based on said calculated time difference.

7. The method of claim 1, further comprising repeating steps (a) to (g) with the acoustic sensor situated at various identified downhole locations.

8. The method of claim 1, wherein said acoustic sensor and said clock are disposed on a tool forming part of a drill string.

9. The method of claim 1, wherein step (b) includes transmitting a representation of the received acoustic signal to a surface location.

10. The method of claim 9, wherein step (e) includes transmitting a representation of the received acoustic signal to a surface location.

11. The method of claim 1, further comprising analyzing multiple points on a waveform associated with the transmitted signal of step (a) or the received signals of steps (b) and (c).

12. A method for determining the drift of a clock disposed on a tool adapted for subsurface disposal, comprising:
   (a) tracking the location of said tool while in subsurface transit;
   (b) transmitting a signal through the subsurface medium from a surface seismic source at a selected time;
   (c) receiving an acoustic signal associated with the transmitted signal at an acoustic sensor disposed on said tool when said tool is at an identified subsurface location;
   (d) determining a first transit time for the received acoustic signal using said clock;
   (e) subsequently returning the tool to said identified subsurface location;
   (f) transmitting a second signal through the subsurface medium from the surface seismic source at another selected time;
   (g) receiving an acoustic signal associated with the second transmitted signal at the acoustic sensor with the tool situated at said identified subsurface location;
   (h) determining a second transit time for the received acoustic signal of step (g) using said clock; and
   (i) calculating a difference between the first and second transit times of said signals.

13. The method of claim 12, further comprising adjusting the clock or the transit time determinations based on the calculated time difference.

14. The method of claim 12, wherein steps (d) or (h) include communicating the determined transit time to a remote location.

15. The method of claim 12, further comprising repeating steps (b) to (i) as the tool travels through the subsurface at various identified subsurface locations.

16. The method of claim 12, wherein step (f) includes transmitting said second signal according to a schedule.

17. The method of claim 16, further comprising determining a clock drift rate based on said calculated time difference.

18. The method of claim 12, wherein step (c) includes transmitting a representation of the received acoustic signal to a surface location.

19. The method of claim 18, wherein step (g) includes transmitting a representation of the received acoustic signal to a surface location.

20. The method of claim 12, further comprising analyzing multiple points on a waveform associated with the transmitted signal of step (b) or the received signals of steps (c) and (g).

21. A system for determining the drift of a clock disposed on a tool adapted for subsurface disposal, comprising:
- an acoustic sensor disposed on the tool and adapted to receive acoustic signals
- processing means coupled to said acoustic sensor for processing the received acoustic signals;
- said processing means coupled to said clock and including means to determine transit times for the acoustic signals received at a specifically identified subsurface location;
- said processing means including means to calculate a difference between the determined transit times corresponding to the acoustic signals received at the same specifically identified subsurface location; and
- said processing means including means to adjust said clock or the transit time determinations based on the calculated time difference.

22. The system of claim 21, further comprising a remote seismic source adapted to transmit subsurface signals.

23. The system of claim 22, wherein said tool comprises means to communicate said arrival times to a remote location.

24. The system of claim 23, further comprising memory coupled to said processing means to store said acoustic signals received at said identified subsurface locations.

25. The system of claim 24, wherein said processing means includes means to encode said acoustic signals received at said identified subsurface locations.

26. The system of claim 21, wherein said processing means includes means to determine a clock drift rate based on said calculated time difference.

27. The system of claim 21, wherein said tool comprises means to communicate representations of the received acoustic signals to a surface location.

28. The system of claim 27, wherein said processing means includes means to analyze multiple points on a waveform associated with said acoustic signals.

* * * * *